United States Patent [19]

Grigat et al.

[11] Patent Number: 5,256,702
[45] Date of Patent: Oct. 26, 1993

[54] METHOD OF FOAMING THERMOPLASTIC POLYCARBONATE

[75] Inventors: Ernst Grigat, Leverkusen; Wolfgang Ebert, Krefeld; Burkhard Köhler, Krefeld; Wolfgang Beer, Krefeld; Ralf Dujardin, Willich-Anrath; Klaus Horn, Krefeld, all of Fed. Rep. of Germany

[73] Assignee: Bayer Aktiengesellschaft, Leverkusen, Fed. Rep. of Germany

[21] Appl. No.: 46,325

[22] Filed: Apr. 14, 1993

Related U.S. Application Data

[62] Division of Ser. No. 989,391, Dec. 11, 1992, Pat. No. 5,223,548.

[30] Foreign Application Priority Data

Dec. 20, 1991 [DE] Fed. Rep. of Germany ....... 4142186

[51] Int. Cl.$^5$ ................................................ C08J 9/14
[52] U.S. Cl. .................... 521/84.1; 521/139; 521/140; 521/180
[58] Field of Search ..................... 521/84.1, 139, 140, 521/180

[56] References Cited

U.S. PATENT DOCUMENTS 3,976,605  8/1976  Matsunaga et al. .......... 260/2.5 HA

FOREIGN PATENT DOCUMENTS 1031507  6/1958  Fed. Rep. of Germany .

OTHER PUBLICATIONS

Database WPIL—AN 88108887[16] and JP-A-63 057 669 (Panac Kogyo KK) Mar. 12, 1988.
R. A. Muzarelli, Chitin, Pergamon Press, Oxford, 1977, pp. 5 ff.

Primary Examiner—Morton Foelak
Attorney, Agent, or Firm—Joseph C. Gil; Aron Preis

[57] ABSTRACT

A method of foaming thermoplastic aromatic polycarbonates is disclosed. Accordingly, a polycarbonate resin is mixed with 0.01 to 10%, the percent being relative to the total weight of polycarbonate resin and polysaccharide, of a particular polysaccharide and the mixture then processed thermoplastically without the application of negative pressure in an extruder, at temperatures of 180° C. to 320° C., or in an injection molding machine, at temperatures of 190° C. to 330° C., to obtain foamed molded articles.

5 Claims, No Drawings

METHOD OF FOAMING THERMOPLASTIC POLYCARBONATE

This application is a division of application Ser. No. 7/989,391 filed Dec. 11, 1992, U.S. Pat. No. 5,223,548.

FIELD OF THE INVENTION

The invention relates to foamable thermoplastic molding compositions and more particularly to polycarbonate based compositions containing polysaccharides.

SUMMARY OF THE INVENTION

A method of foaming thermoplastic aromatic polycarbonates is disclosed. Accordingly, a polycarbonate resin is mixed with 0.01 to 10%, the percent being relative to the total weight of polycarbonate resin and polysaccharide, of a particular polysaccharide and the mixture then processed thermoplastically without the application of negative pressure in an extruder, at temperatures of 180° C. to 320° C., or in an injection molding machine, at temperatures of 190° C. to 330° C., to obtain foamed molded articles.

BACKGROUND OF THE INVENTION

High-molecular polycarbonate foamed plastics are known (see e.g. DE-AS 1,031,507). The foaming agents can be e.g. substances which split off $CO_2$ or inert gases such as $N_2$ or $CO_2$.

Polycarbonates are severely degraded in the presence of amides (see e.g. H. Schnell, Chemistry and Physics of Polycarbonates, Interscience Publishers, New York 1964, page 183).

The use of natural substances for foaming polycarbonates is not taught in the technical literature.

DETAILED DESCRIPTION OF THE INVENTION

The invention relates to a method of foaming thermoplastic aromatic polycarbonates characterized in that thermoplastic aromatic polycarbonates are mixed with 0.01 to 10, preferably 0.05 to 4 and particularly 0.1 to 2% by weight, relative to the total weight of polycarbonate polysaccharide, of amide group-containing polysaccharides and are either extruded at temperatures of 180° C. to 320° C. in extruders without application of negative pressure, to obtain foamed molded members, or are injection molded at temperatures of 190° C. to 330° C. in injection-molding machines to obtain foamed molded members.

Completely unexpectedly, it has been found that polycarbonate can be foamed by adding amide-containing polysaccharides without significantly reducing the molecular weight of the thermoplastic polycarbonate.

The polycarbonate foam obtainable by the method according to the invention is not discolored and has high tenacity, low density and a good cell structure.

The invention therefore also relates to use of amide group-containing polysaccharides for foaming thermoplastic aromatic polycarbonates.

The invention also relates to the polycarbonate foamed molded members obtainable by the method according to the invention.

The polysaccharides according to the invention are amide or amine group-containing polysaccharides or oligosaccharides. These may be obtained from natural raw materials or by synthetic means.

Preferably the polysaccharides are chitin or chitin derivatives such as chitosan, particularly preferably chitin. Chitin in the sense according to the invention is a (1→4)-β-Polymer of 2-acetamido-2-deoxy-D-glucose having the following structure:

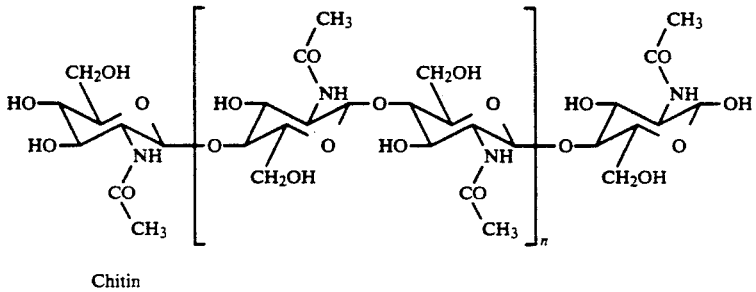

Chitin

The chitin used according to the invention has a residual moisture content of 2–15, preferably 5–11% by weight of water. The water content of the chitin and the polycarbonate together is not sufficient for foaming, and consequently water is not the preferred foaming agent. The nitrogen content of chitin according to the invention is between 6.0 and 7.0% by weight, and the degree of acetylation is between 85 and 100%. The ash content (900° C.) is 0.1–1.3% by weight. Chitin according to the invention has a molecular weight of 10,000–1,000,000, preferably 100,000–600,000.

In nature, chitin mainly occurs as a component of the cell walls or the outer skeleton of fungi, algae, protozoa, cnidaria, aschelmintes, endoprocta, bryozoa, phoronidea, brachiopoda, echiurida, annelida, mollusca, pogonophora and particularly anthropoda (crustacea, insecta, arachnida and chilopoda). With regard to the occurrence and biosynthesis of chitin, see R. A. Muzarelli, Chitin, Pergamon Press, Oxford, 1977, pages 5 ff. All chitin modifications and mixtures thereof, particularly material obtained from crustaceae, are suitable for foaming according to the invention.

Chitin flakes with edge lengths up to 2 cm and a thickness up to 1 mm, or preferably finely-ground material are suitable for foaming polycarbonate according to the invention. The foaming agent is added in conventional metering devices, in solution or preferably solid form or as a concentrated granulate in polycarbonate or in other plastics miscible with polycarbonate.

Impure chitin, e.g. from waste from the fish or crab or similar industry, can also be used for foaming according to the invention. The chitin content of the waste can be from 40 to 100% by weight of the dry material, preferably 70–100% by weight of the dry material, the remainder being native residues of the animals or plants used as the source of chitin.

Exhaustive information about chitin and chitin products can be found in R. A. Muzarelli, Chitin, Pergamon Press, Oxford, 1977; G. O. Aspinall, The Polysaccharides, Vol. 3, Academic Press, Orlando, 1985; W. A. Wood, S. T. Kellog, Methods in Enzymology, vol. 161; Biomass, Part B (Lignin, Pectin, and Chitin), Academic Press, San Diego, 1988; G. Skjak-Braek, T. Anthonson, P. Sandford (Ed.), Chitin and Chitosan, Elsevier, London/New York, 1989.

Chitosan according to the invention is partly or completely deacetylated chitin with an acetylation coefficient of 0–85%, preferably 30–60%. For further details, see the previously-cited literature.

Chitin derivatives according to the invention contain e.g. N-acyl chitosans, N-carboxyalkyl (aryl) chitosans, O-carboxyl alkyl chitosans and chitins, derivatives resulting from incorporation or exchange of sugar units, metal ion chelates, graft copolymers on chitin or chitosan and other chemical modifications of chitin or chitosans.

The impure chitin, chitosan or chitin derivatives according to the invention can be added in metered manner as described in the case of chitin.

The thermoplastic aromatic polycarbonates according to the invention are polycarbonates prepared from diphenols and carbonate donors by the conventional methods known from the literature (see e.g. H. Schnell, Chemistry and Physics of Polycarbonates, Interscience Publishers, New York, 1964, U.S. Pat. No. 3,028,365 and German Offenlegungsschrift 3,832,396 (LeA 26,344)).

The diphenols for these polycarbonates can be e.g. hydroquinone, resorcinol, dihydroxydiphenol, bis-(hydroxyphenyl) alkanes, bis-(hydroxyphenyl) cycloalkanes, bis-(hydroxyphenyl) sulphides, bis-(hydroxyphenyl) ethers, bis-(hydroxy phenyl) ketones, bis-(hydroxyphenyl) sulphones, bis-(hydroxyphenyl) sulphoxides, $\alpha,\alpha'$-bis-(hydroxyphenyl) diisopropyl benzenes or alkylated-ring or halogenated-ring compounds thereof.

The following are examples of preferred diphenols: 4,4'-dihydroxydiphenyl, 2,2-bis-(4-hydroxyphenyl) propane, 2,4-bis-(4-hydroxyphenyl)-2-methyl butane, 1,1-bis-(4-hydroxyphenyl)-p-diisopropanol benzene, 2,2-bis-(3-methyl-4-hydroxyphenyl) propane, 2,2-bis-(3-chloro-4-hydroxyphenyl) propane, bis-(3,5-dimethyl-4-hydroxymethyl) methane, 2,2-bis-(3,5-dimethyl-4-hydroxyphenyl) propane, bis-(3,5-dimethyl-4-hydroxyphenyl) sulphone, 2,4-bis-(3,5-dimethyl-4-hydroxyphenyl)-2-methyl butane, 1,1-bis-(3,5-dimethyl-4-hydroxyphenyl)-p-diisopropyl benzene, 2,2-bis-(3,5-dichloro-4-hydroxyphenyl) propane, 2,2-bis-(3,5-dibromo-4-hydroxyphenyl) propane or 1,1-bis(4-hydroxyphenyl)-3,3,5-trimethyl cyclohexane.

The following are examples of particularly preferred diphenols: 2,2-bis-(4-hydroxyphenyl) propane, 2,2-bis-(3,5-dimethyl-4-hydroxyphenyl) propane, 2,2-bis-(3,S-dichloro-4-hydroxyphenyl)-propane, 2,2bis(3,5-dibromo-4-hydroxyphenyl) propane, 1,1-bis-(4-hydroxyphenyl) cyclohexane or 1,1-bis-(4-hydroxyphenyl)-3,3,5-trimethyl cyclohexane, (2-hydroxyphenyl)-(4-hydroxyphenyl) methane, bis-(4-hydroxyphenyl) methane, bis-$C_4$- hydroxyphenyl) sulphide or bis-(4-hydroxyphenyl) sulphone.

The diphenols can be used either alone or mixed with one another, i.e. both homopolycarbonates and copolycarbonates are included. Djphenols are known from the literature or can be produced by methods known from the literature.

Use also can be made of small quantities, preferably quantities between 0.05 and 2.0 mol relative to the mols of diphenols used, of tri- or more than trifunctional compounds, more particularly compounds with three or more than three phenolic hydroxyl groups. The following are examples of some useable compounds with three or more than three phenolic hydroxyl groups:

Phloroglucinol, 4,6-dimethyl-2,4,6-tri-4-(4-hydroxyphenyl) heptene 2,4,6-dimethyl-2,4,6-tri-(4-hydroxyphenyl) heptane, 1,3,5-tri-(4-hydroxyphenyl) benzene, 1,1,1-tri-(4-hydroxyphenyl) ethane, Tri-(4-hydroxyphenyl) phenyl methane, 2,2-bis-[4,4-bis-(4-hydroxyphenyl) cyclohexyl]propane, 2,4-bis-(4-hydroxyphenyl-isopropyl) phenol, 2,6-bis-(2- hydroxy-5'-methylbenzyl)-4-methyl phenol, 2-(4-hydroxyphenyl)-2-(3,4-dihydroxyphenyl) propane, Hexa-(4-(4-hydroxyphenylisopropyl)-phenyl) orthoterephthalic acid ester, tetra-(4-hydroxyphenyl) methane, Tetra-(4-(4-hydroxyphenyl-isopropyl)-phenoxy) methane and 1,4-bis-(4',4''-dihydroxytriphenyl) methyl benzene.

2,4-dihydroxybenzoic acid, trimesic acid, cyanuric chloride and 3,3-bis-(3-methyl-4-hydroxyphenyl)-2-oxo-2,3-dihydroindole are other possible branching agents.

The optionally additionally-used 0.05 to 2 mol relative to diphenols, of branching agents can be supplied either with the diphenols themselves and the molecular-weight regulators in the aqueous alkaline phase or can be dissolved in an organic solvent and added before phosgenization.

The molecular-weight regulators can be the known substances, preferably monophenols.

The aromatic polycarbonates according to the invention should have weight average molecular weights Mw (obtained by gel permeation chromatography) between 5,000 and 50,000, preferably between 15,000 and 35,000.

The corresponding viscosities in solution are between 1.15 and 1.35, measured in dichloromethane (0.5 g/100 ml).

Thermoplastic aromatic polycarbonates in the sense of the invention include thermoplastic aromatic polyester carbonates, i.e. "polycarbonates" in which a part, up to 50 mol of carbonate structural units are replaced by aromatic dicarboxylate structural units in known manner.

The following are examples of suitable aromatic dicarboxylic acids: orthophthalic acid, terephthalic acid, isophthalic acid, tert. butyl isophthalic acid, 3,3'-diphenyl dicarboxylic acid, 4,4'-diphenyl dicarboxylic acid, 4,4'-diphenyl ether dicarboxylic acid, 4,4'-benzophenone dicarboxylic acid, 3,4'-benzophenone dicarboxylic acid, 4,4'-diphenyl sulphone dicarboxylic acid, 2,2-bis-(4-carboxyphenyl) propane or trimethyl-3-phenyl indane-4,5-dicarboxylic acid.

Among aromatic dicarboxylic acids, terephthalic acid and/or isophthalic acid are particularly preferred.

The diphenols previously mentioned for manufacture of polycarbonate are suitable.

The same applies to the branching agents and the monophenolic chain-breaking agents, but in this case use can also be made of aromatic monocarboxylic acids, e.g. in the form of their acid chlorides or esters.

Carbon dioxide can be incorporated in the polyester carbonates either via $COCl_2$ or via diphenyl carbonate, depending on the chosen method of manufacture, i.e. manufacture of polyester carbonate by interphase polycondensation or melt transesterification.

The same applies to the aromatic dicarboxylic acids; they are used in the form either of aromatic dicarboxylic acid dichlorides in the two-phase interface process or in the form of dicarboxylic acid diesters in the melt transesterification process. The same applies if monocarboxylic acids are used as chain-breaking agents.

The polyester carbonates for foaming according to the invention are prepared by conventional methods, e.g. by the interphase method or the melt transesterification method as already mentioned.

The polyester carbonates for foaming can therefore be either straight-chain or branched in known manner.

The aromatic polyester carbonates according to the invention have weight average molecular weights Mw (determined by gel permeation chromatography) between 5,000 and 50,000, preferably between 15,000 and 35,000.

The corresponding viscosities in solution are between 1.15 and 1.35, measured in dichloromethane (0.5 g/100 ml).

The molar ratio of carbonate units to aromatic dicarboxylate units in the polyester carbonates for foaming according to the invention is at least about 50:50, preferably about 75:25 and particularly about 90:10.

The polycarbonates used in the foaming process according to the invention are either dried or non-dried, preferably non-dried, i.e. the polycarbonates preferably have an $H_2O$ content of 0.01 to 0.1% by weight.

In the method of foaming according to the invention, use can also be made of conventional foaming additives such as reinforcing substances, e.g. glass fibers, and/or nucleating agents and/or flame-retardants and/or mold-release agents and/or dyes and/or pigments, e.g. rutile or carbon black and/or stabilizers against heat, UV radiation and moisture.

The following are examples of suitable flame-retardants, used in proportions of up to 10% by weight relative to the content of polycarbonate: tetrachlorophthalic acid anhydride, tetrabromophthalic acid anhydride, tetrachlorobisphenol-A (monomer or oligomer), tetrabromobisphenol-A (monomer or oligomer) or perfluorobutane sulphonic acid Na or K salt, alone or mixed with poly(tetrafluoroethylene) powder.

The invention therefore also relates to foaming of thermoplastic aromatic polycarbonates with a content of conventional additives, characterized in that themoplastic aromatic polycarbonates, after addition of the conventional additives, are mixed with 0.01 to 10, preferably 0.05 to 4, particularly 0.1 to 2% by weight, relative to the total weight of polycarbonate+polysaccharide, of amide-containing polysaccharides and without application of negative pressure is either extruded at temperatures of 180° C. to 320° C. in an extruder to obtain foamed molded members or injection-molded at temperatures of 190° C. to 330° C. in injection molding machines to obtain foamed molded members.

The invention also relates to the additive-containing polycarbonate foamed molded members obtainable by the aforementioned method according to the invention.

The method according to the invention can also be extended by mixing other thermoplastics with the polycarbonates to be foamed, the proportion of polycarbonates for foaming according to the invention making up 10 to 100, preferably 20 to 100 and particularly 50 to 100% by weight, relative to the weight of the mixture of polycarbonate and other thermoplastics.

The other thermoplastics are preferably thermoplastic polyesters, preferably thermoplastic polyalkylene terephthalates, or ABS polymers, SAN polymers, polysulphones or polyamides, preferably microcrystalline ("amorphous") polyamides, or polyolefins.

The foaming process is not adversely effected by the presence of these other thermoplastics.

The invention therefore also relates to foaming of thermoplastic aromatic polycarbonates mixed with up to 90, preferably up to 80 and particularly up to 50% by weight of other thermoplastics, relative to the total mixture of polycarbonate and other thermoplastics, characterized in that the thermoplastic aromatic polycarbonates are foamed according to the invention when mixed with the respective proportions by weight of other thermoplastics.

The previously-mentioned conventional additives can be used in this case also.

The invention also relates to polycarbonate foam obtainable by the aforementioned method according to the invention and containing other thermoplastics and optionally containing conventional additives.

Known impact-strength modifiers such as hydrogenated butadiene styrene copolymers or acrylate graft rubber can also be added in conventional proportions, e.g. up to 10% by weight relative to the weight of polycarbonate, to the polycarbonates for foaming according to the invention.

The invention therefore also relates to foaming of thermoplastic aromatic polycarbonates in all the variants previously disclosed, characterized in that before the actual foaming operation, impact-strength modifiers are added to the polycarbonates in proportions up to 10% by weight of the polycarbonate.

The invention also relates to polycarbonate foam molded members obtainable by the aforementioned method.

The thermoplastic polyalkylene terephthalates also used according to the invention are e.g. based on ethylene glycol, propane -1,3-diol, butane -1,4-diol, hexane -1,6-diol or 1,4-bis- hydroxymethyl cyclohexane. The molecular weight (Mw) of these polyalkylene glycol terephthalates is between 10,000 and 80,000. The polyalkylene glycol terephthalates can be obtained by known methods, e.g. from terephthalate acid dialkyl ester and the corresponding diol by transesterification. For example, the starting product is a low alkyl ester of terephthalic acid, preferably the dimethyl ester, which is esterified with an excess of diol in the presence of suitable catalysts to obtain the bishydroxyalkyl ester of terephthalic acid. In the process the temperature is increased from an initial 140° C. to 210°-220° C. The liberated alcohol is distilled off. Condensation is then brought about at temperatures of 210°-280° C., the pressure being gradually lowered to below 1 Torr and the excess diol being distilled off.

The thermoplastic ABS polymers also used according to the invention are substances in which either a monomer from the series styrene, methyl methacrylate or a monomer mixture of 95-50% by weight of styrene, α-methyl styrene, methyl methacrylate or mixtures thereof and 5-50% by weight of acryl nitrile, methyl methacrylate, maleic acid anhydride, N-substituted maleic imides or mixtures thereof are graft-polymerized on a rubber. The rubber may more particularly be polybutadiene, butadiene/styrene copolymers with up to 30% by weight of styrene incorporated by polymerization, copolymers of butadiene and acrylonitrile with up to 20% by weight of acrylonitrile or copolymers of butadiene with up to 20% by weight of a low alkyl ether of acrylic or methacrylic acid (e.g. methyl acrylate, ethyl acrylate, methyl methacrylate or ethyl methacrylate).

The graft copolymers contain 5-80, more particularly 20-70% by weight of rubber and 95-20, more particularly 80-30% by weight of graft-copolymerized monomers. In these graft copolymers, the rubber is in the form of at least partially cross-linked particles having an average size of 0.09 to 5 μm, more particularly 0.1 to 1 μm. These graft copolymers are obtained by radical graft copolymerization of monomers from the series styrene, α-methyl styrene, acrylonitrile, methyl methacrylate and maleic acid anhydride in the presence of the rubber to be grafted and are well-known. The preferred methods of manufacturing these graft copolymers are emulsion, solution, mass or suspension polymerization.

The thermoplastic SAN polymers also used according to the invention are copolymers of 95-50 parts by weight of styrene, α-methyl styrene, methyl methacrylate or mixtures thereof and 5-50 parts by weight of acrylonitrile, methacrylonitrile, methyl methacrylate or mixtures thereof. Among these copolymers, particular preference is given to products obtained from about 80-60% by weight of styrene and 20-40% by weight of acrylonitrile, and the corresponding copolymers of α-methyl styrene.

The polysulphones also used according to the invention are e.g. polycondensates containing inter alia sulphone units in the main chain with a molecular weight between 1,000 and 200,000 (measured by gel chromatography) and prepared by conventional methods (see e.g. K. Idel in: Houben-Weyl, Methoden der Organischen Chemie, Volume E20, Part 2, pages 1467 ff., Thieme Verlag, Stuttgart 1987).

The polyamides also used according to the invention are polymers with repeating carboxylic acid amide groups in the main chain, e.g. polycondensates of diamines with dicarboxylic acids or polycondensates of lactams having a molecular weight (measured by gel chromatography) of 1,000 to 100,000 and prepared by the conventional methods (see e.g. P. Matthies, R. V. Meyer in: Houben-Weyl, Methoden der Organischen Chemie, Volume E20, Part 2, pages 1497 ff, Thieme Verlag, Stuttgart 1987), materials with low crystallinity being preferred.

The thermoplastic polyolefins also used according to the invention are polymers of aliphatic unsaturated hydrocarbons, e.g. ethylene, propylene, butylene or isobutylene obtained by conventional methods, e.g. radical polymerization, and having a weight average or molecular weight Mw (measured by gel chromatography) between 1,000 and 3,000,000. High-pressure polyolefin and low-pressure polyolefin can both be used. The unsaturated hydrocarbons can also be copolymerized with other vinyl monomers, e.g. vinyl acetate, in known manner.

The individual components, i.e. polycarbonates, amide group containing polysaccharides, conventional additives, other thermoplastics and/or impact strength modifiers can be previously mixed in known manner at various temperatures, preferably at room temperature.

The components can be mixed e.g. in solution, in methylene chloride or preferably in the substance, the polysaccharides being finely ground when used.

Also, foaming agents in high concentrations (e.g. 3 to 7% by weight of polysaccharides according to the invention) can be incorporated and granulated in polycarbonate or a thermoplastic polymer miscible with polycarbonate and the mixture can be added in concentrated form, using conventional metering devices, to the polycarbonates for foaming according to the invention.

The foaming process according to the invention is then carried out on conventional machines, e.g. single-screw extruders. The suitable methods are free foaming, with or without cooled calibration, or inward foaming, i.e. the Celuka method.

The foamed plastics obtainable according to the invention can be molded as required or cut to size after foaming. The molded members can e.g. be tubes, plates and section members of widely varying kind, optionally dyed, coated or varnished. After foaming, they can be cut to size or mechanically or thermally shaped or processed by other means.

The foamed molded members obtained according to the invention can advantageously be used for producing large-area covers over lamps, casings or office equipment or for producing large-area components such as parts of cupboards or section members such as window-frames or structural parts in the motor-vehicle or building sector.

EXAMPLES

EXAMPLE 1

A mixture of 99% by weight of homopolycarbonate was extruded from 2,2-bis-(4-hydroxyphenyl) propane ($\eta$rel = 1.283; 0.5% in methylene chloride) and 1% by weight of chitin. Extrusion was carried out on a single-screw extruder. The temperature was 240° C. Foaming was carried out without calibration, by the method of free foaming. The result was a fine-pore closed cell foam having a density of 0.6 g/cm$^3$. The relative viscosity of the foam was $\eta$rel = 1.288 (0.5% in methylene chloride).

EXAMPLE 2

A mixture of 98% by weight of homopolycarbonate was extruded from 2,2-bis-(4-hydroxyphenyl) propane ($\theta$rel = 1.282; 0.5% in methylene chloride) and 2% by weight of chitin. Extrusion was carried out on a single-screw extruder. The temperature was 230° C. Foaming was carried out without calibration, by the method of free foaming. The result was a fine-pore closed cell foam having a density of 0.75 g/cm$^3$. The relative viscosity of the foam was $\eta$rel = 1.284 (0.5% in methylene chloride).

EXAMPLE 3

A mixture of 99.5% by weight of homopolycarbonate was extruded from 2,2-bis-(4-hydroxyphenyl) propane ($\eta$rel = 1.282; 0.5% in methylene chloride) and 0.5% by weight of chitin. Extrusion was carried out on a single-screw extruder. The temperature was 260° C. Foaming was carried out without calibration, by the method of free foaming. The result was a fine-pore closed-cell foam having a density of 0.76 g/cm$^3$. The relative viscosity of the foam was $\eta$rel = 1.276 (0.5% in methylene chloride).

EXAMPLE 4

A mixture of 99% by weight of impact strength-modified glass fiber-reinforced homopolycarbonate from 2,2-bis-(4-hydroxyphenyl) propane ($\eta$rel = 1.28; 0.5% in methylene chloride) and 1% by weight of chitin was processed at 310° C. on a double screw injection-molding machine. The resulting injection molded foam members were adjusted to a density of 0.9 kg/l. The injection-molded foamed members efficiently filled the mold with a fine-pored uniform foam structure, which had a relative viscosity of $\eta\text{rel} = 1.25$ and was given the fire classification VO.

We claim:

1. A foamable thermoplastic molding composition comprising a thermoplastic aromatic polycarbonate resin and about 0.01 to 10% of a saccharide compound, said percent being relative to the total weight of polycarbonate resin and saccharide compound, said saccharide being at least one member selected from the group consisting of amine group-containing polysaccharide, amide group-containing polysaccharide, amine group-containing oligo-saccharide, and amide group-containing oligo-saccharide.

2. The composition of claim 1 wherein said saccharide is chitin.

3. The composition of claim 1 wherein said percent is about 0.5 to 4 percent.

4. A foamed molded article obtained by a method comprising
   (i) mixing a thermoplastic aromatic polycarbonate resin and about 0.01 to 10% of a saccharide compound to form a mixture, said percent being relative to the total weight of polycarbonate resin and saccharide compound, said saccharide being at least one member selected from the group consisting of amine group-containing polysaccharide, amide group-containing polysaccharide, amine group-containing oligo-saccharide, and amide group-containing oligo-saccharide, and
   (ii) processing said mixture without application of negative pressure in an extruder at temperatures of 180° C. to 320° C., or in an injection molding machine at temperatures of 190° C. to 330° C.

5. The article of claim 4 wherein said mixture further comprises up to 10% of an impact modifier, said percent being relative to the weight of said polycarbonate.

* * * * *